United States Patent [19]
Cutler et al.

[11] Patent Number: 5,842,871
[45] Date of Patent: Dec. 1, 1998

[54] ELECTRONIC TESTING SYSTEM FOR USE BY MULTIPLE STUDENTS

[75] Inventors: Jay Cutler, Palos Verdes; Stanley Cutler, Van Nuys; Brian Mehler, Long Beach, all of Calif.; Alton B. Otis, Jr., Port Townsend, Wash.

[73] Assignee: Educational Insights, Inc., Carson, Calif.

[21] Appl. No.: 575,401

[22] Filed: Dec. 20, 1995

[51] Int. Cl.⁶ .............................. G09B 7/00; G09B 3/00
[52] U.S. Cl. ..................... 434/335; 434/336; 434/351; 434/352
[58] Field of Search ..................... 434/324, 336, 434/323–325, 331, 335, 337, 341, 344, 347, 350, 351, 352, 307 R

[56] References Cited

U.S. PATENT DOCUMENTS 3,412,480  11/1968  Connell .................................... 434/324
4,290,141   9/1981  Anderson et al. .......................... 455/2

FOREIGN PATENT DOCUMENTS 02059789  2/1990  Japan .
2127201   4/1984  United Kingdom ................... 434/324

*Primary Examiner*—Robert A. Hafner
*Assistant Examiner*—John Edmund Rovnak
*Attorney, Agent, or Firm*—Price, Gess & Ubell

[57] ABSTRACT

The present invention is an electronic teaching system containing two principal components: a projection frame and a hand-held remote unit. The projection frame mediates the electronic test and holds a transparency on an overhead projector so that the transparency may be projected for an entire class to view. Typically the transparency features a series of questions and possible answers to the questions. The projection frame asks the questions and displays the results of the testing process. In a preferred embodiment the projection frame bears a series of pointers, one for each question. When a given question is asked, the corresponding pointer becomes illuminated. Students participate in the test by matching the correct answer to the appropriate question. The students use the second component of the present invention, the hand-held remote unit which bears a keyboard, to answer the question currently being asked by the projection frame. The hand-held remote unit and the projection frame are in wireless communication so that the projection frame is able to respond to the students' answers by indicating correctness of the answers and by awarding points for correct answers.

16 Claims, 6 Drawing Sheets

ELECTRONIC TESTING SYSTEM FOR USE BY MULTIPLE STUDENTS

BACKGROUND OF THE INVENTION

1. Field of the Invention

The present invention relates to the area of education and amusement devices and, more particularly, to electronic testing devices that allow multiple students to simultaneously take part in a test.

2. Description of Related Art

There has been a continuing effort to automate educational techniques, both to husband scarce and expensive teaching resources and as a way to make the educational process more engaging for the student. Initially, there were simple devices wherein probing with a special electronic pen would indicate to a student whether an answer made to a question was correct or incorrect. Later, various scanning technologies were developed that enabled a computer to rapidly grade special test forms. While such an innovation certainly pleased teachers, there is a dearth of evidence suggesting that students also appreciated these advances.

More recently, there have been a number of efforts to develop automated educational techniques that are also attractive to and motivational for students. Since most students seem to enjoy video games, much effort has been expended at adapting video game technologies to educational devices. One result of this marriage of technologies has been complex multimedia games/lessons, usually stored on CD-ROMS (compact disk-read only memories) and used with personal computers. This technology is capable of providing a complete range of audio, as well as full motion video, in an interactive context to pique the students' interest.

Microprocessors have also been used to implement a variety of different "electronic quizzes" used with tests found in a variety of textbooks. The general notion is that a device is programmed with the pattern of correct answers for a preprinted multiple-choice test. The microprocessor then randomly indicates which question the student is to answer and keeps track of the correctness (or lack thereof) of the student's answer. Such a device can be programmed to give positive feedback (i.e., a special response for correct answers), as well as to repeat those questions answered incorrectly. A considerable amount of germane information on these devices is presented in "Electronic Testing Device For Use With Educational Books," U.S. Pat. No. 5,407,357 to Cutler, which is incorporated herein by reference.

The Cutler patent discloses a flexible testing device that can be readily adapted to a variety of preprinted or teacher-prepared quizzes. Although the disclosed device allows a programmed quiz to be readily transferred to multiple units so that many students can independently take the same quiz, the invention does not allow multiple students to simultaneously take the same quiz.

If students were able to simultaneously take the same quiz, they could more readily compete against each other. This competition would add considerable excitement and zest to lessons and significantly enhance the educational experience. Each student would then come to see education as an exciting challenge and redouble his or her efforts to ensure triumph in subsequent quizzes.

OBJECTS AND SUMMARY OF THE INVENTION

It is an object of the present invention to provide a system of electronic testing devices that can be readily operated in a group setting;

It is a further object of the present invention to provide a system of electronic testing devices that permits multiple students equipped with the devices to simultaneously compete against each other; and It is an additional object of the present invention to provide a system of electronic testing devices for group use that provides simultaneous competition and yet allows a teacher to readily devise custom quizzes.

These and additional objects are met by an electronic teaching system comprising two principal components: a projection frame and a hand-held remote unit. The projection frame holds a transparency for use with an overhead projector so that the transparency can be projected for an entire class to view. Typically the transparency features a series of questions and possible answers to the questions. The projection frame asks the questions and displays the results of the testing process. In a preferred embodiment the projection frame bears a series of pointers, one for each question. When a given question is asked, the corresponding pointer becomes illuminated. Students participate in the test by matching the correct answer to the appropriate question. The students use the second component of the present invention, the hand-held remote unit which bears a keyboard, to answer the question currently being asked by the projection frame. The hand-held remote unit and the projection frame are in wireless communication so that the projection frame is able to respond to the students' answers by indicating correctness of the answers and by awarding points for correct answers.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an educational testing device that allows a plurality of students to simultaneously take part in a projected test.

Figure 1:
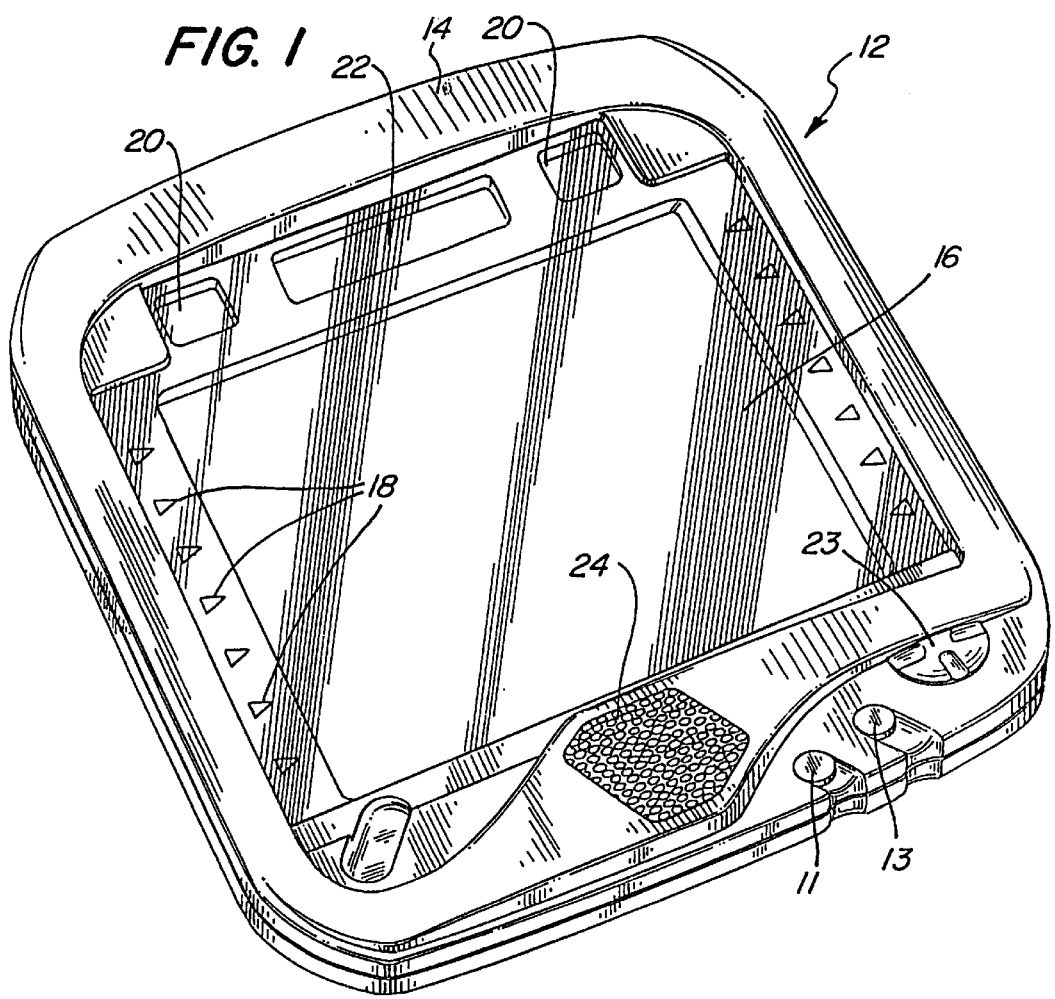
FIG. 1 shows an elevational view of a projection frame of the present invention.

The present invention combines the advantages of an overhead projector with advantages of computer-mediated tests. The invention is actually a system containing several components. A key component is a theater machine or projection frame 12 illustrated in FIG. 1. At its very simplest level the projection frame 12 can be looked upon as a frame which holds a transparency. When this combination is placed on a projection surface of an overhead projector, the transparency can be projected for an entire class to see.

The projection frame 12 consists of a frame portion 14 with a speaker 24 surrounding a window 16. Several controls are located on the frame portion 14 including an ON/OFF key 11, a PAUSE button 13, and a volume control 23. The window 16 is actually a sheet of transparent plastic or the like which is held by the frame portion 14 and allows light from the projector to pass through. The sheet of plastic in the window 16 supports a transparency 40 when the transparency 40 is placed within the frame portion 14. Although the projection frame 12 could be used to project any transparency, it is intended primarily for use with a test-containing transparency. This transparency 40 would ideally ask several questions of the class viewing the projection. In some cases the transparency 40 could also contain answers for the pupils to choose (multiple-choice test).

The ability to project the test obviates the need to make copies and pass them out with the attendant economic costs as well as security risks. Further, because the test is projected, it is relatively easy to provide pictures, etc. to supplement the questions or answers. ("What kind of dog is this?" A picture of a dalmatian is projected along with the question.) Not only does this facility greatly expand the range of questions that can be asked, it is often much easier to write a clear, unambiguous question when the question or answer is based around some sort of graphic image. Although it is possible for the pupils to merely start with the first question and continue on to the end, such a format is not very interesting to members of the video game generation. Therefore, the projection frame 12 also contains means for indicating which of the plurality of questions is the question to be answered at any particular instant.

This is accomplished by a series of pointers 18 arrayed down the left-hand and the right-hand edges of the window 16. There is one pointer 18 for each possible question. The device has fourteen pointers 18, although that number could be easily varied. The current question is indicated by having the pointer 18 immediately adjacent to the question light up. This illumination could be accomplished by making each pointer 18 contain a light source such as an LED or incandescent bulb. In the present embodiment each pointer is actually an LCD "light valve" that alternates between an opaque and a transparent phase. When the LCD beneath the pointer 18 is transparent, light from the overhead projector passes through and the pointer in the projected image appears to light up.

The projection frame 12 is also equipped with a display window 22 which is an LCD alphanumeric display panel which acts as a light valve just as the pointers 18. The display window 22 is used to display player's answers, scores, etc. The display window 22 allows the system to respond to inputs in a variety of ways such as indicating the current scores, etc. In a preferred embodiment two player indicators 20 are provided to indicate which one of two players or teams are to answer next as well as to continually display the current score of that player or team. In an alternative embodiment the display window 22 can be used to indicate which player or team plays next out of a plurality of players or teams by displaying, for example, the player or team's name or number.

Although the projection frame 12 is currently designed around a simple transparency for economic reasons, it should be obvious to one of ordinary skill in the art that these functions could be taken over by an LCD projection panel that can display computer-generated text and graphics. The other functions of the projection frame 12 and the remainder of the system as described below would remain essentially the same.

The projection frame 12, which essentially is a question "asker," is only part of the system. The other part of the system is the question "answerer." This comprises a hand-held remote unit 30 (see FIG. 2) which includes a special keypad to allow one of the players to answer the question posed by the projection frame 12. The remote unit 30 is powered by ordinary batteries 70 that are inserted into a battery compartment on the underside of the unit. Rechargeable batteries can be readily substituted to reduce the cost of replacing batteries.

The remote unit 30 is a small unit containing alphanumeric keys 32 for numerals 1 through 0 as well as a decimal point, a fraction key 34, a "GO" key 35, a "?" key 37, a CLEAR key 36, and a "Send" (enter) key 38. The numerals 1 to 4 also double as the letters A to D. This selection of entry keys enables a player to answer multiple-choice questions (A to D), as well as a wide variety of arithmetic problems. The exact number of keys could be readily altered to suit various purposes. For example, a complete alphanumeric keyboard is well within the conception of the present invention.

The remote unit 30 has a number of special purpose keys. The clear key 36 is used for erasing an answer before sending it to the projection frame 12. The "GO" key 35 is used for starting a game or for requesting the next question. A "?" key 37 requests the correct answer to the current question from the projection frame 12, and a "Send" key 38 acts like a normal enter key on a computer and causes the projection frame 12 to respond to the previously entered key strokes. The actual key strokes may be transmitted as they are entered in which case the projection frame 12 waits to receive a "Send" key before processing the transmitted data. On the other hand, the remote unit 30 could also be programmed to hold all the key strokes until the "Send" key 38 is pressed whereupon the entire message would be transmitted.

To produce a dynamic interaction between the projection frame 12 and each player using one of the remote units 30, it is important that the various components be capable of communicating with each other. It is apparent that the hand-held remotes 30 must be able to communicate with the projection frame 12 if the projection frame 12 is to display answers given by each student using one of the remote units. In addition, scenarios involving communication from the projection frame 12 to the remote unit 30, or even from a first to a second remote unit 30, can be readily visualized. Any of these modes of communication satisfy the parameters of the instant invention, but the currently preferred mode of communication is unidirectional from the remote unit 30 to the projection frame 12 because unidirectional communication simplifies design and production costs.

Any of a number of means for wireless communication between the components could be used. For example, it is possible to use modulated infrared light as in a television remote control. It is also possible to use ultrasonic pulses. The current unit employs high frequency (about 310 MHz) digitally-coded radio signals. This mode of communication was chosen because it has excellent range and is relatively unaffected by room geometry and is immune to ambient light effects.

Having now described the basic hardware involved in the system of the present invention, an example of operation will be given. It will be appreciated that the projection frame 12 must first "know" which particular quiz is being used so that it can determine which questions to ask and which answers are correct. The linkage between quiz and the projection frame 12 is accomplished by giving a different code number to each possible quiz. Each different four-digit question code "tells" the projection frame 12 how many questions the quiz contains and the correct answer for each question. Each code specifies the number of questions in that particular quiz, the question format (see below) for that quiz, and the correct answers for that quiz.

Figure 3:
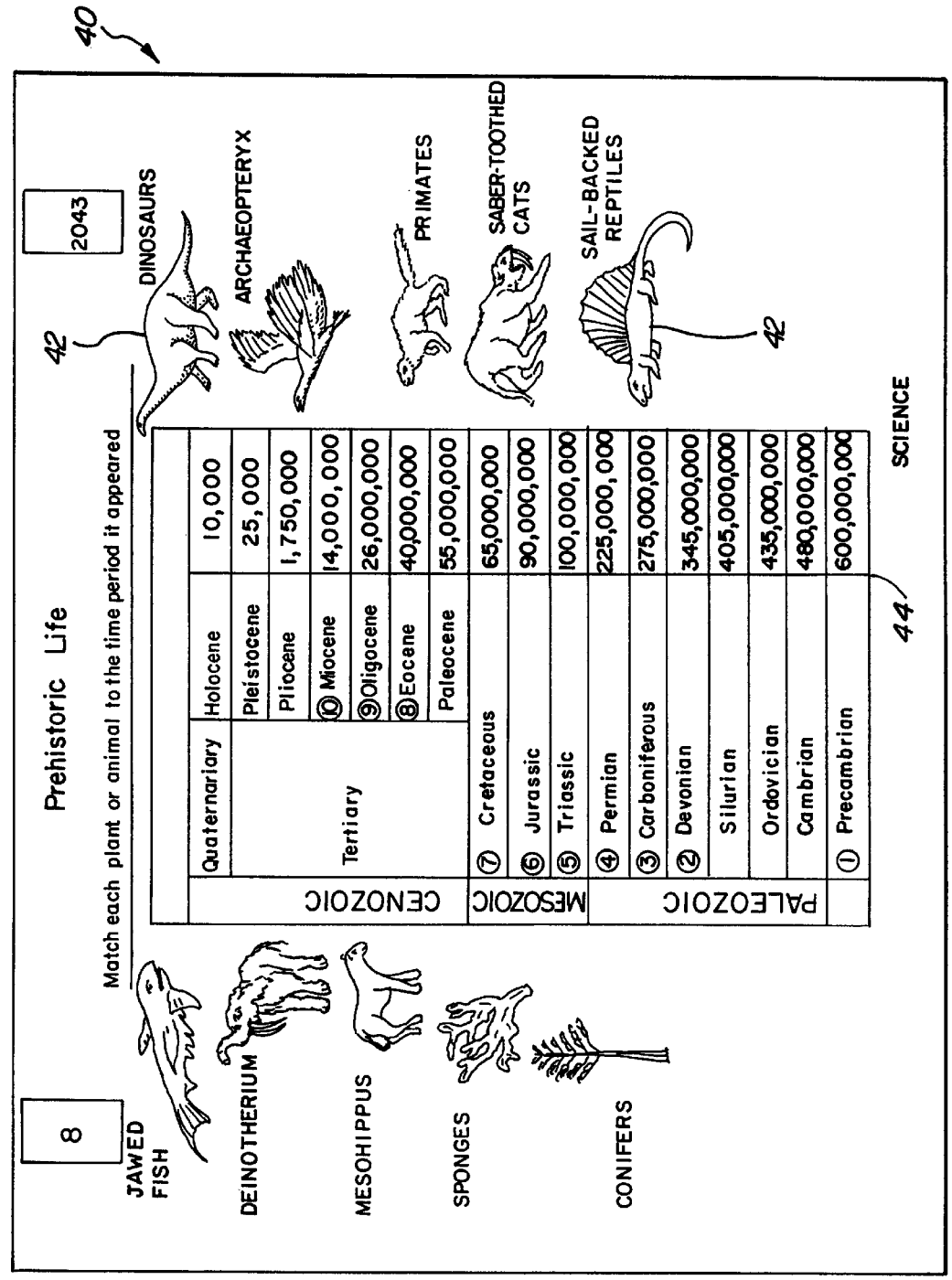
FIG. 3 illustrates a transparency, used with the present invention, showing arrangement of questions and answers.

This can be more readily appreciated by reference to FIG. 3, which illustrates a typical question/answer transparency 40. Questions 42 line the right-hand and left-hand sides of the transparency 40 in registration with the pointers 18 of the projection frame 12 when the transparency 40 is disposed within the window 16. The projection frame 12 can accommodate up to 14 questions (7 on each side), but quiz codes are available that use fewer than the maximum number of questions. The transparency 40 shown in FIG. 3 is arranged for matching answer questions. In this format each question 42 has one correct answer 44 located in a middle area of the transparency 40 between the two rows of questions 42. When a question is asked (i.e., the pointer 18 adjacent the question is illuminated), the students enter the number associated with the correct answer for that particular question. The matching answer question is particularly suitable for use with graphic answers or "fill in the blank" questions.

In the quiz shown in FIG. 3 the questions 42 comprise illustrations of various living organisms. An explanation at the top of the page instructs the student to match each organism with the geologic time period in which it first appeared. The answers 42 in the center of the page comprise a chart of geological time with certain time periods having appended numbers, i.e. Jurassic is number 6. If the question indicated pointed to the archaeopteryx, the correct answer for the player to input would be number 6 since the archaeopteryx is generally dated to the Jurassic period.

The matching answer question is not the only question format accommodated. By determining the correct answer to a question, the question code also determines the format of the question. That is, in a 14-question matching answer test the correct answers would be numbers ranging from 1 to 14. If the correct answers for a particular test are either 1 (or A) or 2 (or B), the test is a two-choice or true/false test. In this case the middle portion of the transparency can be used to explain that 1 is equal to true and 2 is equal to false. Similarly, if the correct answers range from 1 to 4 (or from A to D), the test is a four-choice or multiple-choice test. A fourth type of question is the arithmetic or mathematical question. Each question represents an equation to be solved. The answers can be given on the page with each answer associated with a number so that the question is really a matching answer format. The advantage to this approach is that the answer can be complex or simple with one or many digits including decimals and fractions. Alternatively, if the correct answers are relatively simple (i.e. one or two digit numbers on fractions), the student can directly input those numbers without reference to an answer list.

TABLE 1

Question/Answer Formats

Matching Answers (one answer per question)
Two-Choice Answers (true/false)
Four-Choice Answers (multiple-choice)
Math Answers The point to grasp is that while the system is capable of handling a very large range of test transparencies 40, the answers for each test are preprogrammed so that a simple four-digit code informs the projection frame 12 of the correct answers and question format for a given transparency. This obviates having to provide means to individually input correct answers. In addition, this makes it simple for the teacher to compose custom test transparencies. After the question format (see Table 1) is selected, the teacher merely selects an appropriate quiz code from the teacher's manual and makes certain that the correct answers for the custom test follows the pattern shown in the manual. The selection of possible question codes is so large that it is essentially impossible for the students to learn the pattern of the correct answers and thus defeat the testing system.

TABLE 2

| | Questioning Modes |
|---|---|
| Mode 1 | Noncompetitive (single-player) mode |
| Mode 2 | Player (or team) alternating mode |
| Mode 3 | Head-to-head mode |
| Mode 4 | Teacher control mode |
| Mode 5 | Answer preview mode |

Besides the various question formats, the system also provides a number of modes of operation to add further variety (see Table 2). A first noncompetitive mode is provided for a single player. This is useful for tutoring single pupils or for a teacher to "test run" a new testing transparency 40. In this mode the questions are asked in a random order. Response time is limited, as will be explained below.

In a second mode player alternating competition is enabled. This mode is the "default" mode which the device will use if another mode is not set. In this mode a flashing symbol in one of the player indicators 20 indicates which of the players is to answer next. The questions are asked in random order and the projection frame 12 will recognize an answer only from the player whose turn is indicated by the player indicator 20. Of course, "player" may actually represent teams of players, with members taking turns at giving answers or conferring together to jointly determine the correct answer. The number of players (or teams) is limited by cost of a large number of hand-held remote units 30, as well as by the limited number of questions per testing transparency 40. Two players or two teams is the simplest default mode, but larger numbers of teams or players can be accommodated.

Many students prefer a third, or head-to-head mode, in which the first student to press his or her "GO" key 35 is given a chance to answer the question. If the answer given is incorrect, another player is given a chance to answer. Alternatively, a related mode could allow head-to-head competition for a plurality of students or teams. When the question is asked, the first person to press his or her "GO" key 35 is allowed to answer the question (the identity of the remote unit 12 which is first to send a "GO" key 35 signal can be shown in the display window 22). Again, the maximum number of players (or teams) is determined by the constraints mentioned above. To facilitate scoring, the number of players can be set when the projection frame 12 is initialized at the beginning of each test.

A fourth or teacher control mode allows a teacher to judge the correctness of verbal answers to questions. In this mode the teacher uses one of the hand-held remotes (teacher's unit, explained below) to control the questioning and the awarding of points. After the teacher presses his or her "GO" key 35, the pointers 18 will flash randomly and then indicate which question is to be answered.

There are several ways to handle student responses in the teacher control mode. In the simplest arrangement the students form teams. If a team believes it has the correct answer, it so indicates. The teacher gives permission to make the verbal answer and then awards points (press A for the first team, B for the second team, etc.).

Finally, an answer preview mode is provided for "pre-learning" unusually complex or difficult subjects. In this mode the projection frame 12 sequentially asks the questions and then shows the correct answers. The teacher presses the "GO" key 35 on the teacher's unit to advance to the next question. This allows the teacher plenty of time to completely explain each question and the method used to obtain the correct answer before progressing to the next question. Of course, this mode can also be used following a test given with one of the other modes. Research has shown the importance of demonstrating the correct answers before the students accidentally learn incorrect answers. Besides this preview mode, the other modes can be enabled to show the correct answer whenever one of the students presses the "?" key 37 subsequent to giving an incorrect answer.

Before a test can commence the quiz code, the mode and other parameters must be entered into the projection frame 12. For simplicity and economics the projection frame 12 does not have any input keys. Therefore, the input keys of the hand-held remote units 30 must be used. For this purpose, one of the remote units 30 is designated as a teacher's unit or primary. This unit is identical to the other units 30, but a switch within the battery compartment of the unit is set to "teacher's unit," thus enabling a special code sent on each radio transmission so that the projection frame 12 can identify the teacher's unit. This capability is switchable so that should the teacher's unit break down, another unit can readily be used. In addition, multiple switches 66 can be provided so that a plurality of hand-held remote units 30 can each output a unique signature code. This allows the projection frame 12 to identify the source of any transmission when multiple remote units 30 are in use. After initialization of the projection frame 12, the teacher's unit behaves just like the other hand-held remote units 30. Depending on the number of hand-held remote units 30 available, the teacher may retain the teacher's unit or may give it to one of the students to use after the projection frame 12 is initialized.

The precise sequence followed during initialization is somewhat mode dependant. The following example shows the pattern for the head-to-head competition (mode 3). When initialization begins, "CODE" appears in the display window 22. The teacher uses the teacher's unit to enter the correct question code by inputting four digits and pressing the "Send" key 38. In the case of commercially-prepared test transparencies 40, the question code is located in the upper right-hand corner of the transparency 40. Next, the display window 22 will prompt for "MODE" and the teacher will enter digits corresponding to the desired mode, here mode 3 is entered.

Before the quiz can begin, response times must be set. In mode 3 the unit has two different response times, each applicable to both players. The first response time is the time in which one of the players must press his or her "GO" key 35 to indicate that he or she wishes to answer. The default time is 20 seconds and may be accepted by pressing the "Send" key 38. Alternatively, this time may be changed when "Time 1–99" along with "20" appears in the display window 22 by inputting a new number (from 1–99). The second time is the time given to respond with a correct answer after first indicating a desire to answer. The default for this time is 5 seconds, but may be changed in a manner similar to the first 20-second response time. After setting the response times, the teacher starts the competition by pressing the "GO" key 35.

The pointers 18 light in a random alternating fashion until only a single pointer 18, indicating the current question, remains lit. A clock symbol appears in the display window 22 and begins to count down the first response time. The first player to press his or her "GO" key 35 within the response time gets to answer. When the "GO" key is pressed a musical tone sounds and an "arrow" symbol appears in that players player indicator 20. The indicated player then has the second response time (i.e., 5 seconds) to give a correct answer by entering the number representative of the answer and pressing the "Send" key 38.

If the student's answer is incorrect, the projection frame 12 produces a distinctive wrong answer sound and another player gets a chance to answer. After a correct answer is given or after the response time is exhausted, the next question is asked. After all the questions have been asked, the test ends and the final scores are displayed, along with an indication of which questions were missed by each player. This gives the teacher a good opportunity to discuss the questions answered incorrectly so that the students will not repeat their errors.

Figure 4:
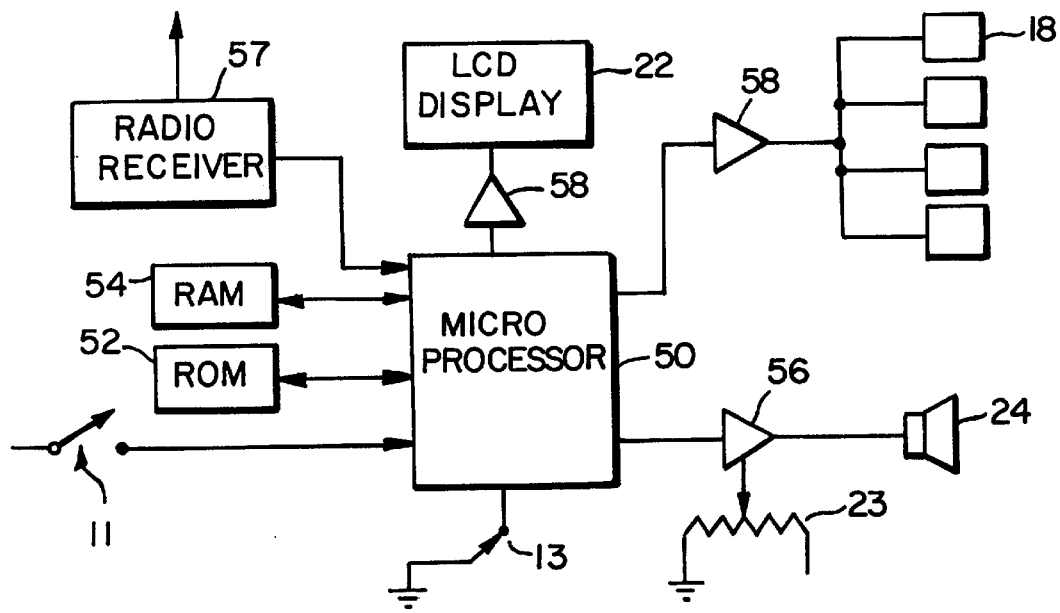
FIG. 4 shows a block diagram of the projection frame of the present invention.

FIG. 4 illustrates a block diagram of the projection frame 12. The ON/OFF switch 11 controls power to a microprocessor or microcontroller 50 which executes a program stored in a ROM (Read Only Memory) 52. Alternatively, the microprocessor 50 can contain the ROM 52 internally as a flash ROM or EPROM or may come preprogrammed with an integral mask ROM. During program execution the microprocessor 50 uses volatile random access memory (RAM) 54; alternatively, the RAM 54 may be integral to the microprocessor 50.

The microprocessor 50 drives the speaker 24 by means of a driver 56 which has a volume control 23. The microprocessor 50 also drives the LCD pointers 18 and the LCD player indicators 20 and display window 22 by means of LCD drivers 58. Again, the LCD drivers 58 may be included within the microprocessor 50. The microprocessor 50 receives two main inputs: the "PAUSE" button 13, whose activation causes software execution to pause, and a digital signal from a radio receiver 57, which receives digitally encoded signals transmitted by the hand-held remote units 30.

Figure 5:
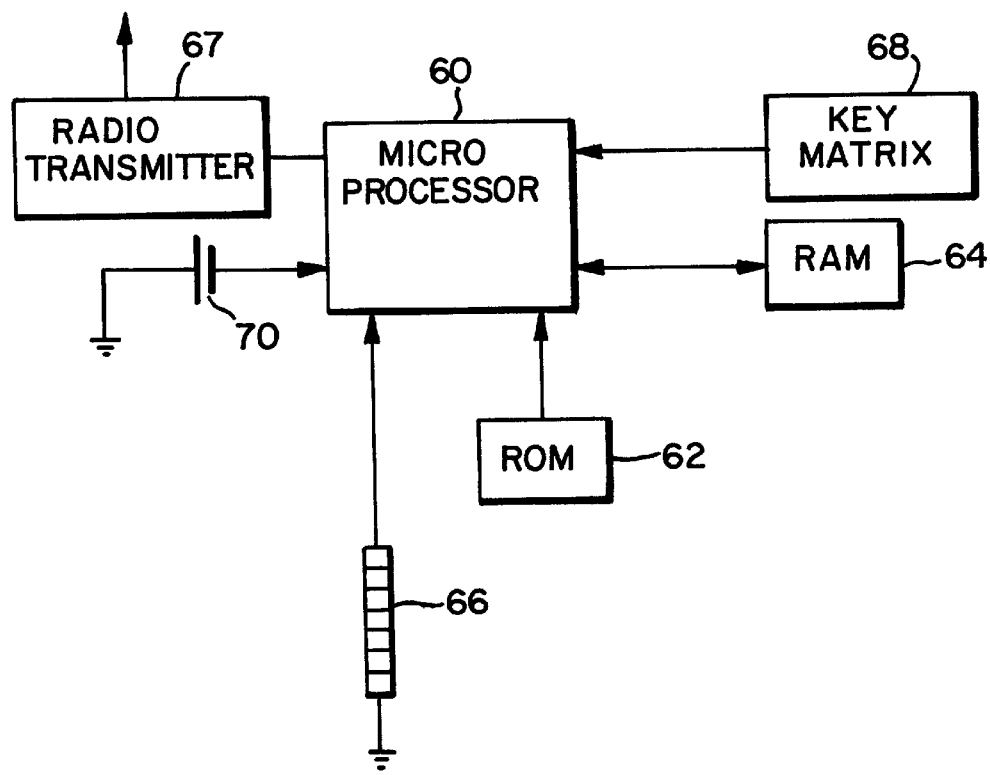
FIG. 5 illustrates a block diagram of the hand-held remote unit of the present invention.

A block diagram of the hand-held remote unit 30 is shown in FIG. 5. A microprocessor 60 is powered by the battery 70; there is no ON/OFF switch, since the unit is controlled by a time-out circuit integral to the microprocessor 60. The microprocessor 60 executes a program stored in a ROM 62 and utilizes a RAM 64. The preferred microprocessor 60 contains integral RAM and an integral mask ROM. The sole inputs to the microprocessor are a switch array 66 and a key matrix 68 which contains the alphanumeric keys 32, as well as the "GO" key 35, clear button 36, "?" key 37, and "Send" (enter) key 38.

The switch array 66 can be used to set the hand-held remote unit 30 as a teacher's unit and/or to set unit identity numbers when a plurality of hand-held remote units are used. The microprocessor 60 acts essentially as a keyboard controller. The keys input through the key matrix 68 are interpreted and sent to a radio transmitter 67, which transmits them as digitally encoded signals along with a digital "signature" signal (set by the switch array 66) to the radio receiver 57 in the projection frame 12.

Figure 6:
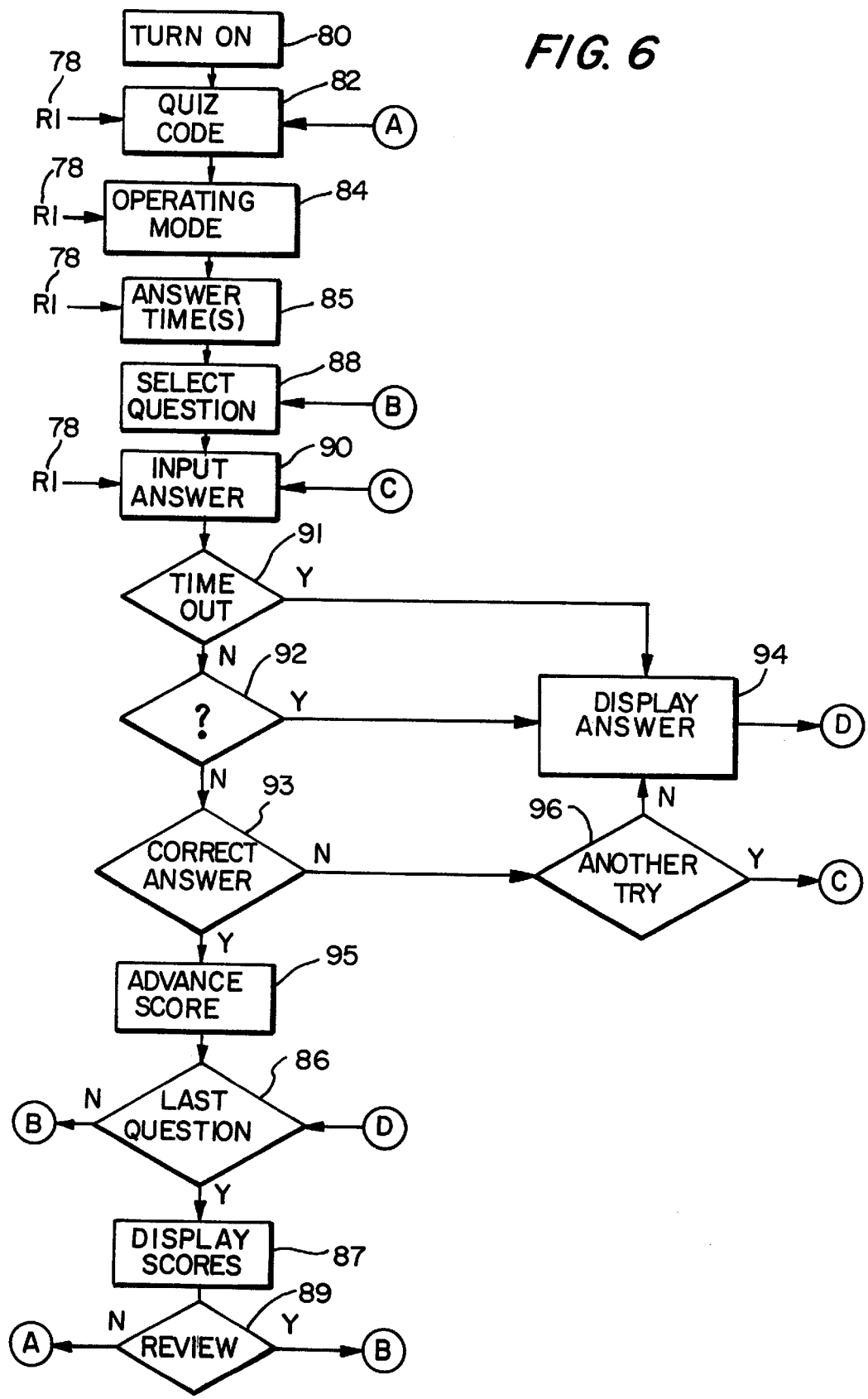
FIG. 6 illustrates a flow diagram of a program that controls the projection frame of the present invention.

FIG. 6 shows a flow diagram of the program that operates the projection frame 12 to enable those of ordinary skill in the art to replicate the current invention. Besides the routines described below the program also has a "Pause" routine which responds to the "PAUSE" key 13 by temporarily halting execution until that key is pressed a second time. The diagram starts with a "Turn On" step 80 during which the unit initializes itself and displays "HI" in the display window 22. The program then passes on to a "Quiz Code" routine 82 which inspects radio input 78 for a valid quiz code. The "Quiz Code" routine 82 will only accept input from the teacher's unit.

After a valid question code is entered and displayed in the display window 22, program control passes to a "Mode" routine 84. This routine searches digital data from the radio receiver 57 for valid mode codes; again, input is accepted only from the teacher's unit. Finally, a "Time" routine 85 receives radio input 78 from the teacher's unit to set time-out response periods for answering the questions. The "Mode" routine 84 and the "Time" routine 85 may have default values as explained above. The routines are designed to display the default values on the display window 22 and accept them if the projection frame 12 receives a "Send" key 38 signal.

As soon as the "Time" routine 85 receives the "GO" key 35 signal from the teacher's unit, control passes to a "Select Question" routine 88. This routine interacts with a table of questions stored in the ROM 52 and determined by the question code just input. A random number generator within the "Select Question" routine 88 selects one of the unasked questions as a current question. The pointers 18 of all the questions blink on and off randomly until only the current question's pointer 18 remains illuminated. The table of questions is then updated so that the current question will not be asked again.

Control passes to a "Input Answer" routine 90. This routine interacts with the mode selection from the "Mode" routine 84. If the mode is a player alternating mode, then the "Mode" routine 84 will provide a player list indicating how many players are allowed to play. The "Input Answer" routine 90 will cause an indicator signifying the first player to display in the player indicators 20. Thereafter, the "Input Answer" routine 90 will accept an answer only from the indicated player. On subsequent iterations the second player on the list becomes permitted and so on. If the mode is a head-to-head competition mode, the permitted player routine displays an indication of a "free for all." The first "GO" key 35 signal received determines the first player and only input from that player is then recognized.

The "Input Answer" routine 90 continues to accept responses for the time-out response period which is checked by a "Time Out" routine 91. Control passes through a "? key" routine 92 to a "Correct Answer" routine 93. This routine compares the answer to the correct answers obtained from the "Quiz Code" routine 82. If the answer is correct, control is passed to a "Advance Score" routine 95, which sounds a correct answer tone, records the question on a correct answer list (so it will not be reviewed later) and increments a score tally for the correct answering player. If no answer is received within the time-out period, control passes to a "Display Answer" routine 94 where, epending on mode, the correct answer is displayed after which control passes to a "Last Question" routine 86. If the "?" key 73 is pressed, control also passes to the "Display Answer" routine 94 for the correct answer to be displayed.

If the answer received is not correct, control passes to a "Another Try" routine 96, which records the question asked on a wrong answer list for possible later review, sounds a wrong answer tone and, depending on the mode, may decrement the score of the player who gave the incorrect answer. In some tests at least one additional attempted answer (for a lower point value) is permitted, so control is passed back to the "Input Answer" routine 90 for another chance to answer the question. Thereafter, control passes through routine 96 and back to the "Last Question" routine 86.

If all the questions have been asked, control is passed to a "Display Score" routine 87, which determines the winner. Alternatively, some modes will delete the incorrectly answered questions from the asked question list so that play can continue until all questions have been correctly answered. If the incorrectly answered questions are not repeated, control passes to a "Review" routine 89. This routine is also mode dependant and may not be activated in all modes. When activated, the "Review" routine 89 indicates (by means of the pointers 18) which questions were answered incorrectly and then sequentially asks each question again. Finally, control passes back to the "Quiz Code" routine 82 to start the cycle over.

Figure 2:
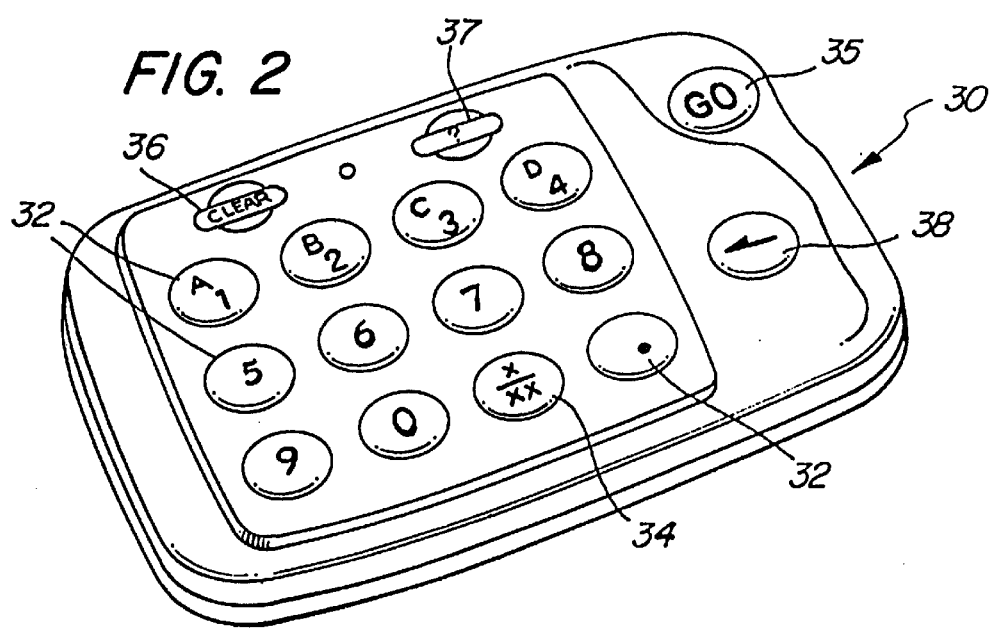
FIG. 2 shows an elevational view of a hand-held remote unit of the present invention.
Figure 7:
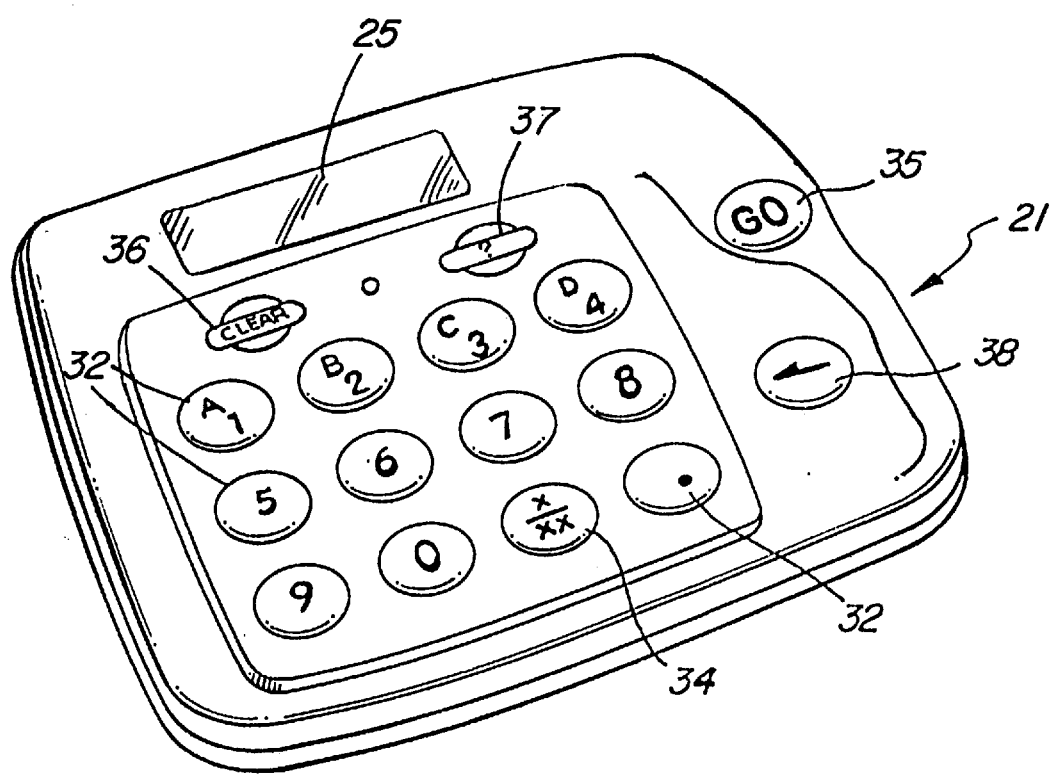
FIG. 7 illustrates a satellite unit of the present invention.

As explained above, the number of hand-held remote units 30 used may be limited by economics or logistics. A special remote unit known as a "satellite" unit 21 is also available (see FIG. 7). In external appearance the satellite unit 21 can be virtually identical to the remote unit as shown in FIG. 2 with the addition of a small display panel 25 for showing scores, etc. The satellite unit 21 has the same selections of keys as the remote unit 30. The presently preferred embodiment of the satellite unit 21 does not even contain the digital radio transmitter 67. Instead, the satellite unit's microprocessor runs a modified version of the program used in the projection frame 12. The program operates permanently in a special version of the single user mode in synchrony with the projection frame 12 also operating in this mode. In this mode of operation the asking order of questions is specified by the quiz code.

Both the satellite units 21 and the projection frame 12 are initialized by inputting the appropriate quiz code and a synchronization code. When the projection frame 12 is ready to start, the teacher tells each person to press the "GO" key 35 on his or her satellite unit. At the same time the teacher presses the "GO" key 35 on the teacher's unit to start the projection frame 12. The first question is indicated and, because the satellite units are operating in synchrony with identical question codes, each unit "knows" the correct answer. After any input, each unit can use the display panel 25 to show its user whether the answer was correct or not. Each unit also accumulates an individual's score and a list of missed questions for its user. When the test is finished, the teacher can obtain that score from each unit for grading or instructional (i.e., based on examination of the list of missed questions) purposes.

Although the satellite units 21 are actually operating independently of the projection frame 12, the students experience an illusion that the satellite units 21 and the projection frame 12 are linked. An alternative embodiment ensures the synchrony of the satellite units 21 by equipping each unit with a digital radio receiver. This receiver is used to receive question code information and a "GO" signal from the projection frame 12 as well as an indication of the current question. This allows the questions to be asked randomly. The great advantage of either embodiment of the satellite unit 21 is that a potentially unlimited number of students are able to take part in the quiz. If the projection frame 12 were actually in simultaneous communication with dozens of satellite units 21, an unnecessarily complex projection frame 12 would be required. With the current invention any number of satellite units 21 can be added with no effect on the projection frame 12.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An electronic teaching system for simultaneous use by students in a group setting, the system comprising:
    a projection unit for use with an overhead projector, the projection unit comprising:
        means for holding a transparency containing readable questions so that the overhead projector can project the transparency for students to read;
        receiver means for wirelessly receiving data without a physical connection to a source of the data;
        processor means for executing a stored program for interpreting the data received by the receiver means and converting said data received by said receiver means into scores and display data, and for operating a display means;
        display means for indicating a question on the transparency to be answered next, and for showing said display data and scores; and
    portable answering means for sending data to the projection unit for initializing the projection unit and for sending data representing answers to questions indicated by the projection unit, each portable answering means comprising:
        keyboard means for inputting data;
        transmitting means for wirelessly transmitting data to the projection unit without a physical connection to the projection unit; and
        microprocessor means for executing a stored program for transmitting data input fiom said keyboard means by way of the transmitting means.

2. The electronic teaching system of claim 1 wherein the projection unit further comprises audio means for making an audible response to the received data.

3. The electronic teaching system of claim 1 further including means for synchronizing the projection unit with the portable answering means including start buttons on the portable answering means.

4. The electronic teaching system of claim 3 wherein the means for synchronizing includes means for generating a synchronizing signal.

5. An electric teaching device for use with a projector comprising:
    means for holding a transparency containing readable questions so that the projector can project the transparency for students to read;
    receiver means for wirelessly receiving data from an external source without a physical connection to the external source, the data including an indication of a correct answer to an indicated question;
    processor means for executing a stored program interpreting the data received by the receiver means and converting said data received by said receiver means into scores and display data, and for operating a display means; and
    display means for indicating a question on the transparency to be answered next and for showing said received data and scores.

6. The electronic teaching device of claim 5 further comprising means for making an audio response to data received by the receiver means.

7. An electronic teaching device for use with a projector to administer a test comprising:
    means for holding a transparency containing readable questions so that the projector can project questions for students to read;
    display means for indicating a question on the transparency to be answered next and for showing data and scores;
    receiver means for wirelessly receiving data from an external data source without having a physical connection to the data source, the data including an answer to the indicated question; and
    processor means for executing a stored program for interpreting the data received by the receiver means, and for operating the display means, the processor means comprising:
        means for determining a question code which specifies a number of questions for the test and a correct answer for each of the questions;
        means for specifying a mode of operation, the mode controlling a manner of student response to each question;
        means for randomly selecting and indicating a next question which has not previously been selected and indicated;
        means for determining which students are permitted to answer the next question based on the specified mode of operation and student responses;
        means for comparing answers submitted by the permitted students to the correct answer provided by the question code means to determine correctness of each submitted answer;
        means for assigning points as a reward for each correct answer; and
        means for displaying a total of points accumulated by each permitted student when all of the questions on the transparency have been answered.

8. The electronic teaching device of claim 7, wherein the processor means further comprises means for allowing, depending on the mode of operation and the question code, an opportunity for the students to submit an additional answer when an earlier submitted answer is determined to be incorrect.

9. The electronic teaching device of claim 7 further comprising means to make audible responses to received data.

10. The electronic teaching device of claim 7, wherein the processor means further comprises means for specifying and measuring a time period taken by the students to answer the next question so that answers are accepted only before the time period has elapsed.

11. The electronic teaching device of claim 7, wherein the means for specifying a mode specifies a head-to-head competition mode wherein the means for determining identifies a student permitted to answer the next question by detecting which student is first to transmit a message following indication of the next question by the means for randomly selecting and indicating.

12. The electronic teaching device of claim 7, wherein the means for specifying a mode specifies a teacher control mode wherein the means for determining, the means for comparing answers and the means for allowing are replaced by a teacher who determines which student should answer the next question, who receives an answer from the determined student, who judges correctness of the answer, and who uses the means for assigning to award points to the determined student when the answer is correct.

13. A teaching apparatus for use with an overhead projector comprising:

a plurality of hand-held answering units having keyboard means for entering input signals, and communication means for wirelessly communicating said input signals to a distant receiver unit, said answering units each further comprising means for converting one of said answering units into a master unit whereby remaining answering units are slaved to said master unit; and frame means adapted for cooperating with an overhead projector to secure a transparency thereon for projection of said transparency onto a distant screen, said frame means removable from said overhead projector and comprising means for wirelessly receiving said input signals transmitted from said answering units, microprocessing means cooperating with said means for wirelessly receiving said input signals for interpreting said input signals, and means for generating audio signals in response to said received input signals.

14. The teaching apparatus as recited in claim 13 wherein said frame means further comprises indicating means controlled by said microprocessing means for indicating to one viewing said screen a selected region of said transparency by selectively permitting light from said overhead projector to pass through one of a plurality of apertures along a border of said frame means.

15. The teaching apparatus as recited in claim 14 wherein said frame means includes a generally rectangular first open window defined by first and second spaced apart pairs of edges, said pairs of edges having recessed regions adapted to seat a transparency therein, and wherein said first pair of spaced apart edges include said indicating means for indicating a selected region of said transparency, and wherein one of said second pair of spaced apart edges includes a second window for indicating numerical feedback to said input signals.

16. A two way wireless electronic teaching system comprising:

a projection frame means for visually displaying information on a screen, including means for holding a transparency containing the information, said projection frame means further comprising means for wirelessly transmitting and receiving data to and from each of a plurality of remote answering units, said projection frame means recognizing the received data as being from a particular one of said plurality of remote answering units; and in the plurality of remote answering units for wirelessly transmitting and receiving data to and from said projection frame means, each remote answering unit comprising keyboard means for inputting data, means for wirelessly communicating the data to the projection frame means, and microprocessor means for executing programmed instructions.

* * * * *